Jan. 7, 1930.  J. A. THOMPSON  1,742,942
ANTISKID DEVICE
Filed Nov. 26, 1927
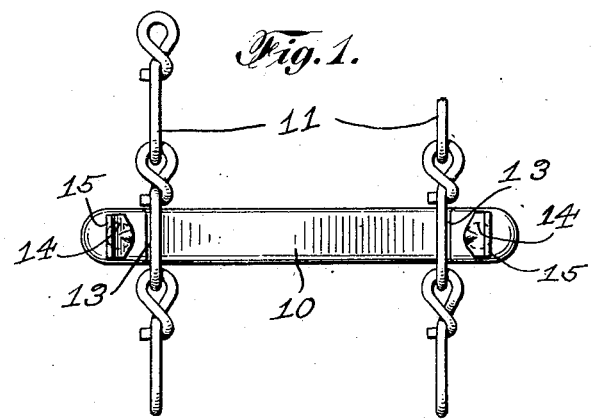
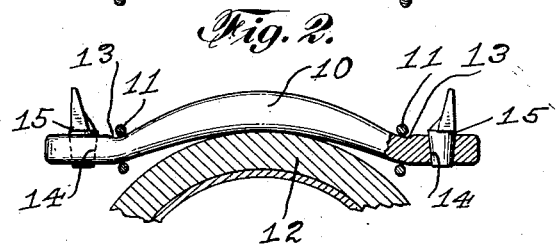
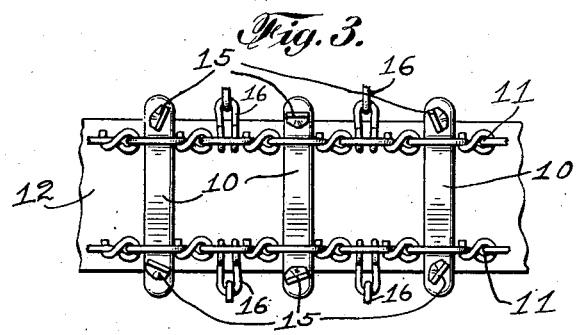
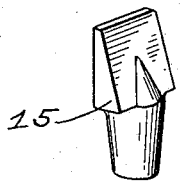
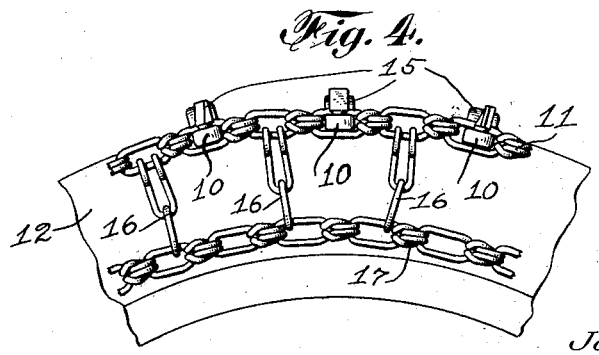
INVENTOR
Jonas A. Thompson
BY
H. G. Manning
ATTORNEY Patented Jan. 7, 1930

1,742,942

UNITED STATES PATENT OFFICE

JONAS A. THOMPSON, OF WALES, MASSACHUSETTS

ANTISKID DEVICE

Application filed November 26, 1927. Serial No. 235,997.

This invention relates to anti-skid devices and more particularly to improvements in anti-skid devices adapted for use in anti-skid chain structure applicable to automobile tires and the like.

One object of this invention is to provide a novel cross member structure adapted to fit the tread portion of an automobile tire.

A further object is to provide a novel form of cross bar with calks at its ends.

A further object is to provide a tire chain structure comprising a plurality of cross bars adapted for direct attachment to chains provided for location at opposite sides of the tire tread when the tire chain structure is in use, and calks at opposite ends of said bars and adapted to prevent separation of the bars from said chains.

A further object is to provide anti-skid devices including calks of novel form and characteristics.

With these and other objects in view there has been illustrated on the accompanying drawings one form in which the invention may be conveniently embodied in practice.

Fig. 1 is a fragmentary view illustrating one of the anti-skid devices connected at opposite ends with chains.

Fig. 2 is a view partly in section illustrating an anti-skid cross member applied to the tread of the tire.

Fig. 3 is a view illustrating an anti-skid tire chain as seen at the tread surface.

Fig. 4 is a side view of the tire chain as applied to a tire.

Fig. 5 is a perspective view of one of the calks.

Referring now to the drawings in which like reference numerals denote corresponding parts throughout the several views, the numeral 10 indicates each of a plurality of cross members or bars connecting two chains 11 designed to extend around a tire 12 at opposite sides of the tread portion.

Preferably each of the cross members or bars 10 is curved so that its inner side will fit the tread of the tire under ordinary conditions of use. Also the outer ends of each bar 10 are constructed so as to permit insertion thereof through links of the chains 11, such cross bar being provided at each end with depressions 13 at their outer upper faces to receive the outer portions of the links through which the corresponding ends of the cross member project and providing at their outer edges shoulders tending to retain the links on such cross bar. At its outer ends beyond the recesses 13, each cross bar 10 is provided with a tapered bore 14 adapted to receive the tapered or frusto-conical inner end or shank of a plug or calk 15 of any suitable material such as steel.

Preferably each calk has a wedge-shaped outer end with one face substantially parallel to the axis of the shank and with harder steel at such face than at the opposite face. It will be apparent that in use such a calk will wear out faster at its softer face and will tend to keep the calk sharp with its edge at the face parallel to the axis of the shank. Although a preferred form of calk has been described, it should be understood that use may be made of calks of various shapes and sizes and sharper or blunter as desired. Due to their tapered shanks the calks will be driven in tighter the more the car is driven while at the same time it may readily be removed and replaced when worn out or when desirable for other reasons.

At points between successive cross bars 10 each chain 11 is joined by a chain connection 16 with a side chain 17, one of which is positioned in use at each side of the tire adjacent the rim engaging portion thereof. In this way there is formed a double chain each side of the tire chain. When a tire chain of the kind just described is secured on a tire, any tendency for side slipping or skidding will be prevented by engagement of the calks 15 with the material at the surface of the roadway. Such skidding tendency may also be resisted due to engagement of the chains 11 between successive cross members with the surface of the road. As illustrated in Fig. 3, the plugs or calks 15 may pivot or turn to different angular positions when in use.

In assembling a tire chain embodying the present invention, the tire is partially deflated, the tire chain applied, and the tire then inflated to the desired pressure. These tire chains are adapted for use on different kinds of cars, such as passenger cars or trucks, and will function effectively to prevent skidding on icy pavements or pavements slippery from other causes. In rounding curves the spring or elasticity of the tire will cause the outside lugs or calks to penetrate the ice or other material tending to cause skidding. It will be apparent that in such tire chains the cross members 10 will tend to prevent wear on the chain elements and of the tire itself. In a tire chain such as illustrated, the calks 15, the cross members 10, and the connections 16 may be easily removed and replaced. As illustrated, the connections 16 may include connecting links such as ordinarily supplied for repairing tire chains.

While there has been disclosed in this specification one form in which the invention may be embodied, it is to be understood that this form is shown for the purpose of illustration only, and that the invention is not to be limited to the specific disclosure, but may be modified and embodied in various other forms without departing from the spirit. In short, the invention includes all the modifications and embodiments coming within the scope of the following claims.

Having thus fully described the invention, what is claimed as new, and for which it is desired to secure Letters Patent, is:

1. In an anti-skid device for an automobile tire, two chains for use at opposite sides of the tread of said tire, cross bars shaped at their ends to project into the links of said chains, and calks in the ends of said bars outside said chains serving to prevent separation of said chains and cross members.

2. In an anti-skid device for use on an automobile tire, two chains for use at opposite sides of the rim-engaging portion of the tire, two chains for use at oppoiste sides of the tread portion, connections at intervals at each side of the tire between the chain nearer the rim-engaging portion of the tire and the chain adjacent the tread, and cross members having their ends projecting through the second-mentioned chains between said connections and having inwardly facing shoulders to hold such chains thereon.

3. In an anti-skid device for use on an automobile tire, two chains to be located alongside the rim-engaging portions of said tire, two chains to be located at opposite sides of the tread portion, a plurality of solid one-piece cross members extending transversely of said tire and connected to said tread chains, means located between said cross members for connecting said rim chains to said tread chains, and anti-skid means at the ends of said cross members for locking said tread chains in position.

In testimony whereof, I have affixed my signature to this specification.

JONAS A. THOMPSON.